United States Patent
Zhu et al.

(10) Patent No.: US 11,703,577 B2
(45) Date of Patent: Jul. 18, 2023

(54) RECALIBRATION DETERMINATION SYSTEM FOR AUTONOMOUS DRIVING VEHICLES WITH MULTIPLE LIDAR SENSORS

(71) Applicant: Baidu USA LLC, Sunnyvale, CA (US)

(72) Inventors: Fan Zhu, Sunnyvale, CA (US); Kecheng Xu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 261 days.

(21) Appl. No.: 16/994,268

(22) Filed: Aug. 14, 2020

(65) Prior Publication Data
US 2022/0050191 A1 Feb. 17, 2022

(51) Int. Cl.
*G01S 7/497* (2006.01)
*G01S 17/931* (2020.01)
*G01S 17/42* (2006.01)

(52) U.S. Cl.
CPC ............ *G01S 7/4972* (2013.01); *G01S 17/42* (2013.01); *G01S 17/931* (2020.01)

(58) Field of Classification Search
CPC ....... G01S 7/4972; G01S 17/931; G01S 17/42
See application file for complete search history.

(56) References Cited

U.S. PATENT DOCUMENTS

| | | | |
|---|---|---|---|
| 10,891,747 B1* | 1/2021 | Choe | G06V 20/58 |
| 11,117,591 B2* | 9/2021 | Meng | G01S 17/42 |
| 11,221,413 B2* | 1/2022 | Liang | G06N 3/04 |
| 2018/0313942 A1* | 11/2018 | Wu | G01S 17/42 |
| 2020/0410260 A1* | 12/2020 | Choe | G06T 11/203 |
| 2020/0410704 A1* | 12/2020 | Choe | G06T 7/55 |

* cited by examiner

*Primary Examiner* — Bryan Bui
(74) *Attorney, Agent, or Firm* — Womble Bond Dickinson (US) LLP

(57) ABSTRACT

Described herein are various embodiments for identifying miscalibrations in LiDAR sensors installed on an ADV in real time while the ADV is in motion, and notifying a user that the LiDAR sensors needs to be recalibrated. An exemplary method includes calculating an initial number of overlapping cloud points between the cloud point data from a first LiDAR sensor and a second LiDAR sensor; and replacing a set of existing calibration parameters of the second LiDAR sensor with multiple sets of recalibration parameters to calculate multiple revised numbers of overlapping cloud points between the point cloud data. A potential miscalibration can be detected in the first LiDAR sensor or the second LiDAR sensor when the initial number of overlapping cloud points is smaller than at least one revised number of overlapping cloud points. The potential miscalibration can be verified by repeating the above operations multiple times with a time of time following each repetition.

20 Claims, 9 Drawing Sheets

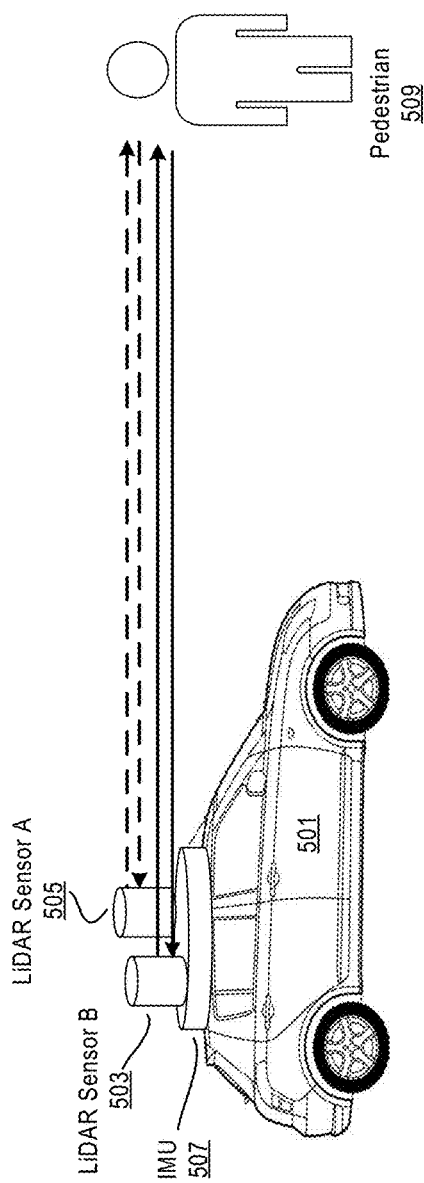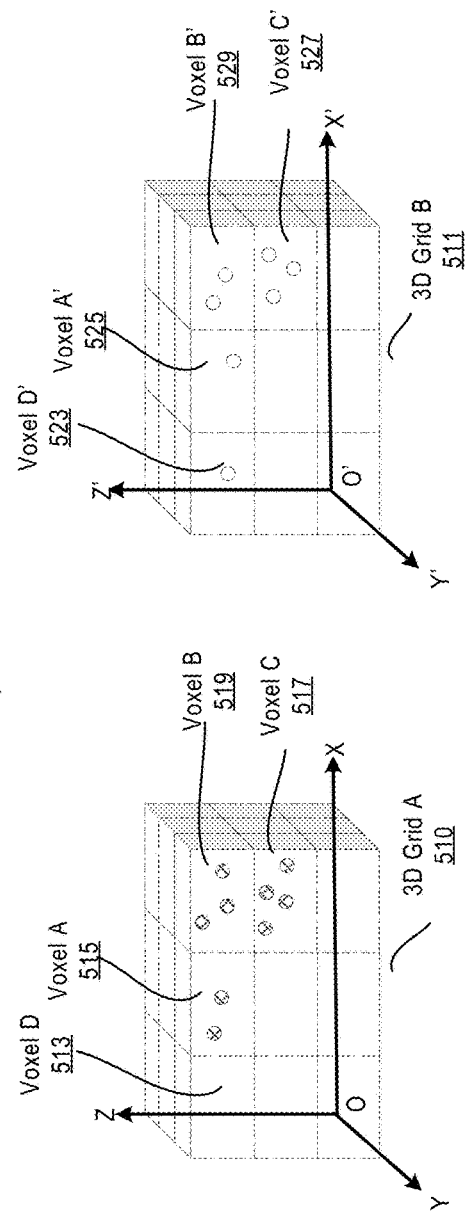
FIG. 5A
FIG. 5B
FIG. 5C

RECALIBRATION DETERMINATION SYSTEM FOR AUTONOMOUS DRIVING VEHICLES WITH MULTIPLE LIDAR SENSORS

TECHNICAL FIELD

Embodiments of the present disclosure relate generally to operating autonomous driving vehicles. More particularly, embodiments of the disclosure relate to LiDAR sensors recalibration determination.

BACKGROUND

An autonomous driving vehicle (ADV) is a vehicle operating in an autonomous mode (e.g., driverless). An ADV can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An ADV may include multiple sensors, for example, LiDAR sensors, inertial measurement units (IMU), and cameras. The sensors need to be calibrated so that they are positioned on the ADV with a high degree of accuracy, which allows the ADV to bring data from the multiple sensors into a common coordinate frame for environmental perception. The well-calibrated sensors may become miscalibrated over time, for example, due to vibrations experienced by the sensors when the ADV travels on bumpy roads.

BRIEF DESCRIPTION OF THE DRAWINGS

Embodiments of the disclosure are illustrated by way of example and not limitation in the figures of the accompanying drawings in which like references indicate similar elements.

FIGS. 5A-5C illustrate examples of 3D grids including point clouds from LiDAR sensors to one embodiment.

DETAILED DESCRIPTION

Figure 1:
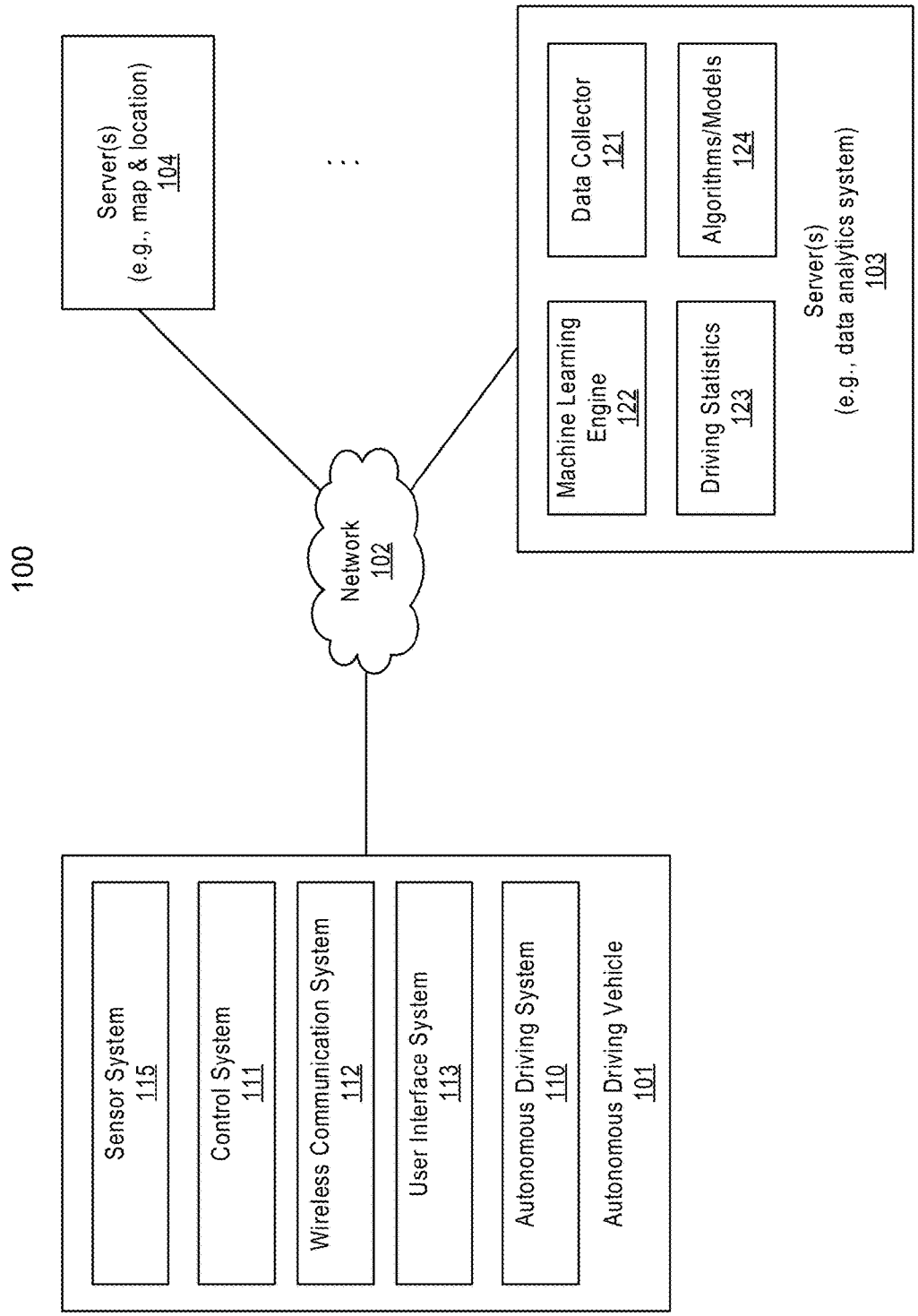
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, the disclosure describes methods and systems for identifying in real time miscalibrations in LiDAR sensors installed on an ADV, and sending a notification indicating that the LiDAR sensors need to be recalibrated.

An exemplary method includes calculating an initial number of overlapping cloud points between the cloud point data from a first LiDAR sensor and a second LiDAR sensor; and replacing a set of existing calibration parameters of the second LiDAR sensor with multiple sets of recalibration parameters. The method further includes calculating a revised number of overlapping cloud points between the point cloud data from the first LiDAR sensor and the second LiDAR sensor for each set of recalibration parameters; and comparing the initial number of overlapping cloud points with each revised number of overlapping cloud points. The method further includes determining that a potential miscalibration exists in the first LiDAR sensor or the second LiDAR sensor when the initial number of overlapping cloud points is smaller than at least one revised number of overlapping cloud points.

In one embodiment, when a potential miscalibration is identified, the operations used for identifying the potential miscalibration can be repeated for a number of times, with a gap of time (e.g., 1 minute) following each repetition. If the potential miscalibration does not go away, a notification can be generated indicating that both the first LiDAR sensor and the second LiDAR sensors need to recalibrated.

In one embodiment, when calculating the initial number of the overlapping cloud points, point cloud data from the first LiDAR sensor is converted to a first local coordinate system and placed into a first 3D grid, and point cloud data from the second LiDAR sensor is converted to a second local coordinate system, and placed into a second 3D grid. The two 3D grids have the same size and the same number of voxels. A number of overlapping cloud points in an overlapping space between each pair of corresponding voxels in the two 3D grids can be calculated. A total number of overlapping cloud points between the two 3D grids can be obtained by summarizing the numbers of overlapping cloud points between the multiple pairs of corresponding voxels.

In one embodiment, the first local coordinate system uses the center of the first LiDAR sensor as the origin, and the second local coordinate system uses the center of the second LiDAR sensor as the origin. The existing calibration parameters and each set of recalibration parameters of the second LiDAR sensors include lever arm offsets, and a relative heading between the second LiDAR sensor and an inertial measurement unit (IMU) installed on the ADV.

In one embodiment, the cloud point data from the first LiDAR sensor and the second LiDAR sensor are collected from an object at a distance exceeding a predetermined threshold to make a potential miscalibration more visible. In one embodiment, when there are more than 2 LiDAR sensors installed on the ADV, each pair of LiDAR sensors can be verified using the above operations to detect any miscalibration in that pair of LiDAR sensors.

The embodiments described herein allow miscalibrations and shifted results in the LiDAR sensors on an ADV to be automatically identified in real time, and generate reminder so that appropriate actions can be taken to address the miscalibrations. The above summary does not include an exhaustive list of all embodiments in this disclosure. All systems and methods can be practiced from all suitable combinations of the various aspects and embodiments described in the disclosure.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
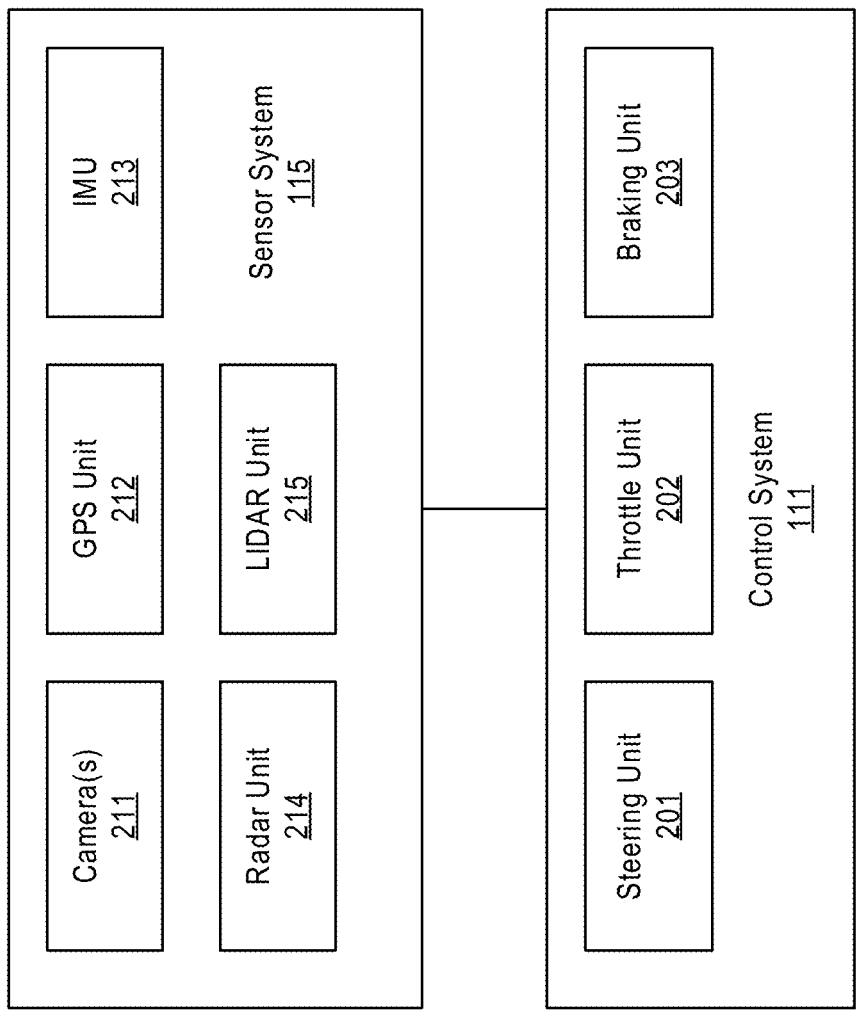
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Figure 3A:
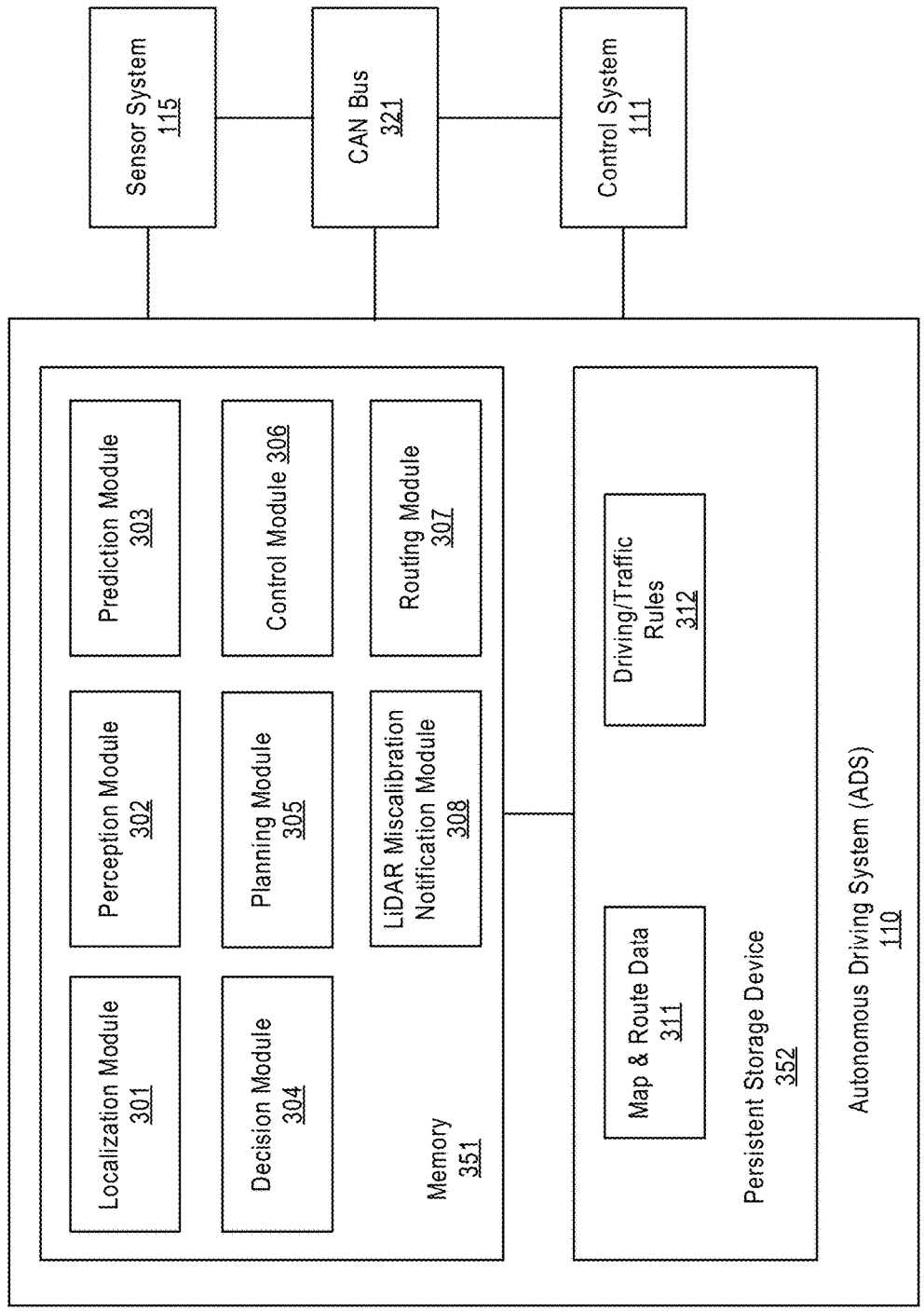
FIGS. 3A-3B are block diagrams illustrating an example of a perception and planning system used with an autonomous vehicle according to one embodiment.
Figure 3B:
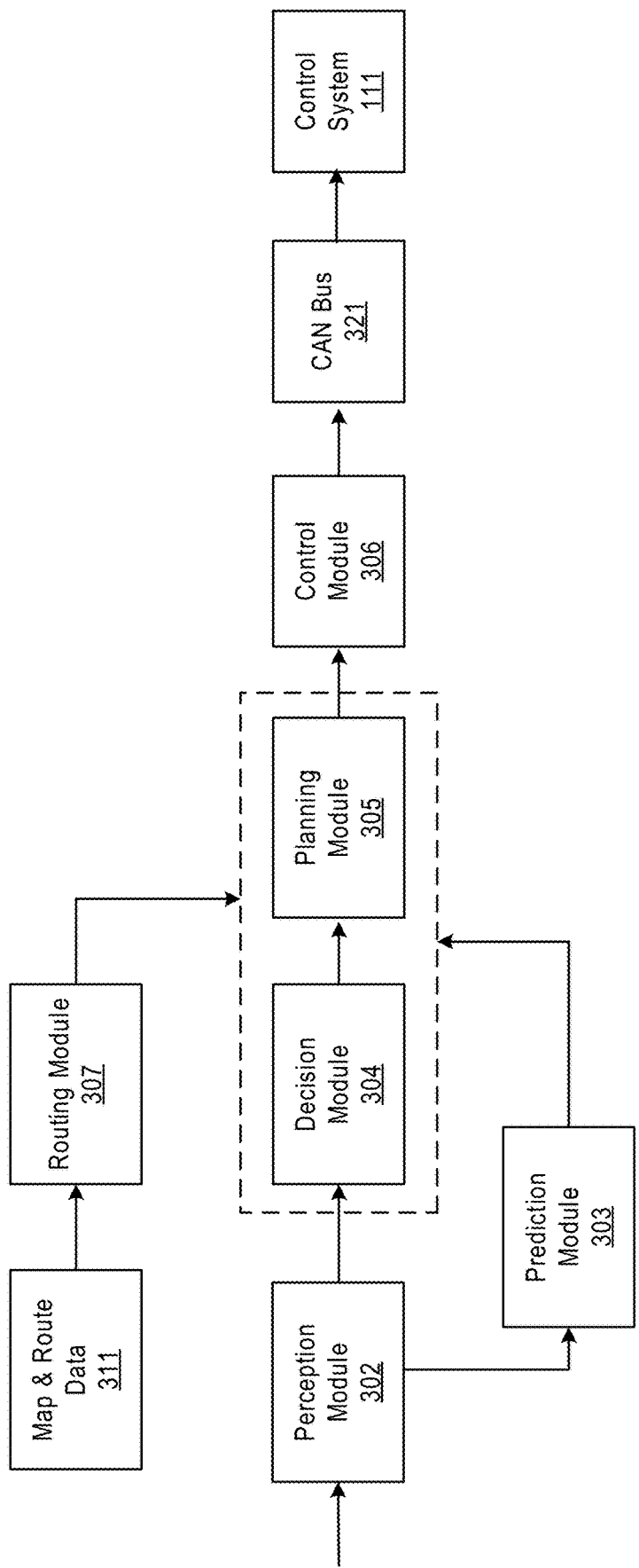

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route or trajectory for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111 via a CAN bus module 321, according to a trajectory (also referred to as a route or path) defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

LiDAR miscalibration notification module 308 can identify miscalibrations in LiDAR sensors, and sending notifications indicating such. The miscalibrations can be identified based on comparing an initial number of overlapping cloud points between point cloud data from a pair of LiDAR sensors and each revised numbers of overlapping cloud points between the point cloud data. The initial number and the revised numbers are calculated from the same cloud point data but using different calibration parameters.

LiDAR Sensor Miscalibration Notification

Figure 4:
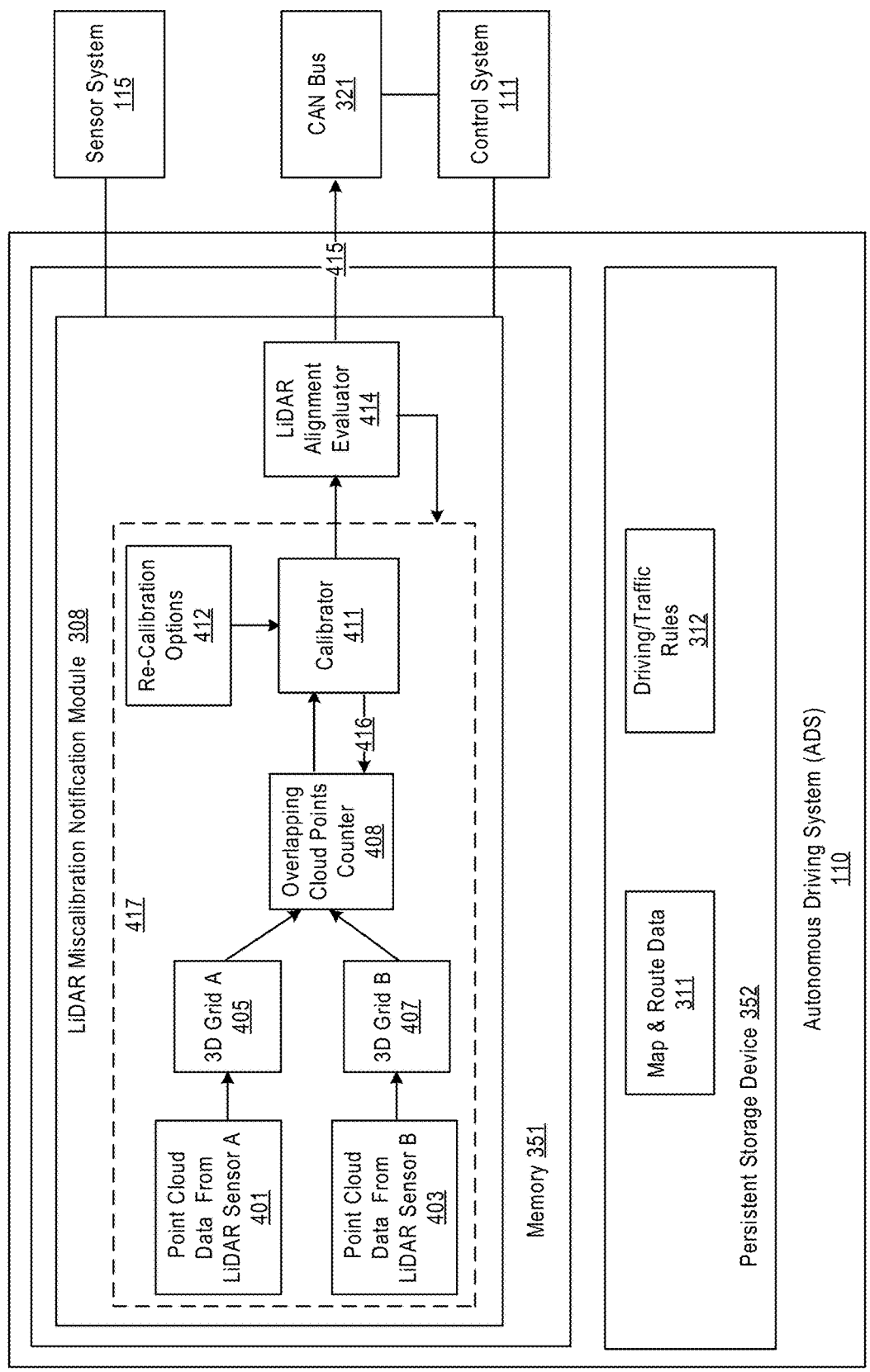
FIG. 4 illustrates an example of a system for generating a LiDAR miscalibration notification for an ADV according to one embodiment.

FIG. 4 illustrates an example of a system for generating a LiDAR miscalibration notification for an ADV according to one embodiment.

In one embodiment, the system may reside in the autonomous driving system 110 of the ADV 101 with multiple LiDAR sensors installed thereon. The LiDAR sensors are calibrated with each other and with an IMU sensor on the ADV 101. Each LiDAR sensor may be associated with extrinsic calibration parameters and intrinsic parameters. The intrinsic calibration parameters may be set in advance by manufacturers, while the extrinsic calibration parameters can be dynamically adjusted by the ADS 110. The extrinsic parameters may be used for spatial transformation of coordinates of a LiDAR sensor to other sensors or reference frames.

In one embodiment, the LiDAR miscalibration notification module 308 can collect point cloud data from LiDAR sensor A 401 and point cloud data from LiDAR B 403. The point cloud data 401 and 403 from the two LiDAR sensors include multiple cloud points, each of which is associated with a set of X, Y and Z coordinates in a world coordinate system.

In one embodiment, the point cloud data 401 and 403 can be converted to two vehicle coordinate systems. The first local coordinate system uses the center of the first LiDAR sensor as the origin, and the second local coordinate system uses the center of the second LiDAR sensor as the origin.

In one embodiment, each local coordinate system can be divided into a 3D grid. Each 3D grid can include the same number of equal-sized voxels, and each voxel can be a 0.1 m*0.1 m*0.1 m cube.

In one embodiment, after point cloud data from a LiDAR sensor is converted to its corresponding local coordinate system, each cloud point in the point cloud data can be placed into a voxel in the corresponding 3D grid. For example, a cloud point (5.15, 5.12, 5.22) and a cloud point (5.12, 5.15, 5.25) are to be placed or mapped to a same voxel in a 3D grid.

As shown in FIG. 4, a first 3D grid 405 and a second 3D grid 407 can be created to respectively hold point clouds from LiDAR sensor A and LiDAR sensor B. When a cloud point from LiDAR sensor A is placed into a voxel in the first 3D grid and a cloud point from LiDAR sensor B is placed into a corresponding voxel in the second 3D grid, the two cloud points may be placed into an overlapped space between the pair of corresponding voxels. In the above scenario, the two cloud point are considered as being overlapped, and the pair of corresponding voxels is considered to include at least one overlapping cloud point.

In one embodiment, an overlapping cloud points counter 408 can count overlapping cloud points between the first 3D grid 405 and the second 3D grid 407. An example of a formula used by the overlapping cloud points counter 408 is provided below:

$$\Sigma \min(\text{Grid1}_{\{i, j, k\}}, \text{Grid2}\_\{i, j\ k\}).$$

In the above formula, Grid1{i, j, k} represents a voxel in the first 3D grid 405, and Grid2{i, j, k} represents the corresponding voxel in the second 3D grid 407, the min ( ) function can be used to find the overlapping cloud points between the two voxels. Using the above formula, the overlapping cloud points counter 408 can add the overlapping cloud points in each pair of corresponding voxels in the two 3D grids 405 and 407 together to obtain a total number of overlapping cloud points between the two 3D grids 405 and 407.

The LiDAR miscalibration notification module 308 can verify whether the calibrations of the LiDAR sensors are appropriate by varying the existing calibrations. In one embodiment, a calibrator 411 can replace the extrinsic calibration parameters of either LiDAR sensor A or LiDAR sensor B with a set of new extrinsic calibration parameter to calculate a revised number of overlapping cloud points between the two LiDAR sensors. For the purpose of illustration, the calibration parameters of LiDAR sensor B are replaced for calculating the revised numbers of overlapping cloud points.

In one embodiment, multiple set of recalibration parameters stored in a recalibration options data structure 412 can be used to calculate the revised numbers of overlapping cloud points between the two LiDAR sensors. Each set of recalibration parameters can be a set of extrinsic parameters of LiDAR sensor B, and can be in the form of quaternions.

In one embodiment, each set of recalibration parameters can include lever-arm offsets of LiDAR sensor B and a heading of the second LiDAR sensor relative to an inertial measurement unit (IMU) installed on the ADV.

In one embodiment, when mounted on the ADV 101, the center of LiDAR sensor B and the center of the IMU may not be the same, and the lever-arm offsets represent an origin difference vector between the LiDAR sensor and the IMU. Similarly, the coordinate axes of the LiDAR sensor and the IMU can may not be strictly parallel, and the relative heading can represent boresight angles regarding roll, yaw, pitch between the LiDAR sensor and the IMU.

In one embodiment, the calibrator 411 can replace the existing lever-arm offsets and the relative heading for LiDAR sensor B with each set of recalibration parameters below:

a. 1 cm, 0 cm, 0 cm, 0 degree
    b. 0 cm, 1 cm, 0 cm, 0 degree
    c. 0 cm, 0 cm, 1 cm, 0 degree
    d. 0 cm, 0 cm, 0 cm, 1 degree The calibrator 411 can convert the point cloud data from LiDAR sensor B to the second 3D grid 407 using each set of recalibration parameters. Due to the differences between the initial calibration parameters and each set of recalibration parameters for LiDAR sensor B, the second 3D grid 407 may contain different numbers of cloud points in each voxel. The calibrator 411 can invoke 416 the overlapping cloud points counter 408 to obtain a revised number of overlapping cloud points between LiDAR sensor A and LiDAR sensor B for each set of recalibration parameters.

In one embodiment, a LiDAR alignment evaluator 414 can receive the revised numbers of overlapping cloud points and the initial number of overlapping cloud points, and can compare the initial number with each revised number. If no revised number is larger than the initial number, the LiDAR alignment evaluator 414 can determine that the existing calibrations of LiDAR sensor B are appropriate and does not need to be modified.

Otherwise, if at least one revised number is larger than the initial number, the LiDAR alignment evaluator 414 can determine that a potential miscalibration exists for LiDAR sensor B. The LiDAR alignment evaluator 414 can repeat the number of operations 417 for a predetermined number of times (e.g. 10 times), with a predetermined gap following each repetition.

In one embodiment, the operations 417 can be performed for each driving cycle of the ADV (e.g., 100 ms). If a potential miscalibration is detected in any cycle, the LiDAR alignment evaluator 414 can change the frequency of performing the operations 417. For example, instead of executing the operations 417 in each driving cycle, the LiDAR alignment evaluator 414 can the operations 417 for a period of time (e.g., 1 minute) after each execution. The operations 417 can be repeated in such a manner for a predetermined number of times to check if the potential miscalibration will go away after the number of pauses.

In one embodiment, if, during any of the predetermined repetitions, a revised number is determined to be larger than the initial number, the LiDAR alignment evaluator 414 can send 415 a notification message via the CAN bus 321 to alert a user that a recalibration of the LiDAR sensors may be needed.

Since the LiDAR miscalibration notification module 308 cannot pinpoint which of LiDAR sensor A and LiDAR sensor B has the miscalibrations, the notification message may alert the user that both LiDAR sensors need to be recalibrated. The CAN bus module 321 can sent the message to a display screen.

In one embodiment, if there are more than 2 LiDAR sensors, each pair of LiDAR sensors can be verified in the manner that LiDAR sensor A and LiDAR sensor B are verified.

In one embodiment, the overlapping cloud points counter 408 may selectively count overlapping cloud points originated only from an object at a predetermined distance. The predetermined distance can be a distance exceeding a threshold. For example, the object can be 10 meters in front of the ADV 101, or 10 meters from either side of the ADV 101. Objects at a far distance can enlarge the calibration drifts, and therefore make the calibration drifts more visible.

FIGS. 5A-5C illustrate examples of 3D grids including point clouds from LiDAR sensors according to one embodiment.

As shown in FIG. 5A, the ADV 101 can include LiDAR sensor A 503, LiDAR sensor B 505, and an IMU 507. The LiDAR sensors 503 and 507 are calibrated to be aligned with each other and with the IMU 507. When the ADV 101 travels, both LiDAR sensors 503 and 505 may detect a pedestrian 509 in front of the ADV 101 and generate point cloud data. The point cloud data can be converted to data in local coordinate systems. Each local coordinate system uses the center of a LiDAR sensor as its origin. Alternatively, data from both LiDAR sensors 503 and 505 may be converted to one local coordinate system that uses the center of the ADV as the origin. In FIGS. 5A-5C, data from the LiDAR sensors are converted into two local coordinate systems.

The converted point cloud data from LiDAR sensor A 503 and LiDAR sensor B 505 is placed respectively into 3D grid A 510 in FIG. 5B and 3d grid B 511 in Figure C. In one embodiment, the two 3D grids 510 and 511 can have the same size, and have the same number of equal-sized voxels.

As shown in FIG. 5B, the 3D grid A 510 includes 2 cloud points in voxel A 515, three cloud points in voxel B 519, and 4 cloud points in voxel C 517. All the cloud points in the 3D grid A 510 are generated by LiDAR sensor A 503.

In FIG. 5C, the 3D gird B 511 includes one cloud point in voxel A' 525, two cloud points in voxel B' 529, and three cloud points in voxel C' 527, and one cloud point in voxel D' 523. All cloud points in 3D grid B 511 are generated by LiDAR sensor B 505.

To calculate the number of overlapping cloud points in the two 3D grids 510 and 511, each voxel of the 3D grid 510 can be compared with the corresponding voxel in the 3D grid 511 to determine the overlapping cloud points between the pair of voxels. The overlapping cloud points in each pair of voxels can then be added to get the total number of overlapping cloud points between the two 3D grids 510 and 511.

Figure 6:
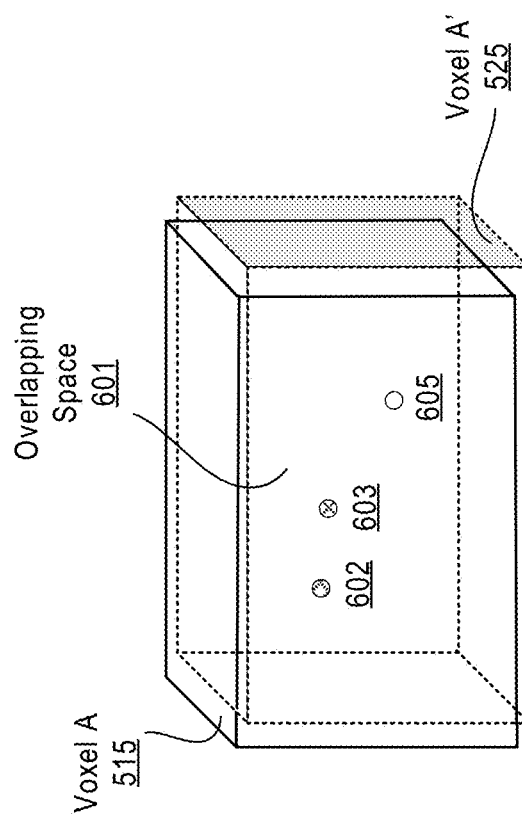
FIG. 6 illustrates an example of an overlapped space between a pair of corresponding voxels according to one embodiment.

FIG. 6 illustrates overlapping cloud points between a pair of corresponding voxels according to one embodiment. The overlapping cloud points between each pair of voxels is the overlapping cloud points in an overlapped space between the pair of voxels. FIG. 6 uses the pair of corresponding voxels 515 and 525 as an example.

As shown, the pair of voxels 515 and 525 have an overlapping space 602, which contains two cloud points 602 and 603 from LiDAR sensor A 505, and one cloud point 605 from LiDAR sensor B 503. The number of overlapping cloud points between the pair of voxels is the minimum number of cloud points from either LiDAR sensor. In this illustration, the overlapping cloud points between the pair of voxels is 1.

Figure 7:
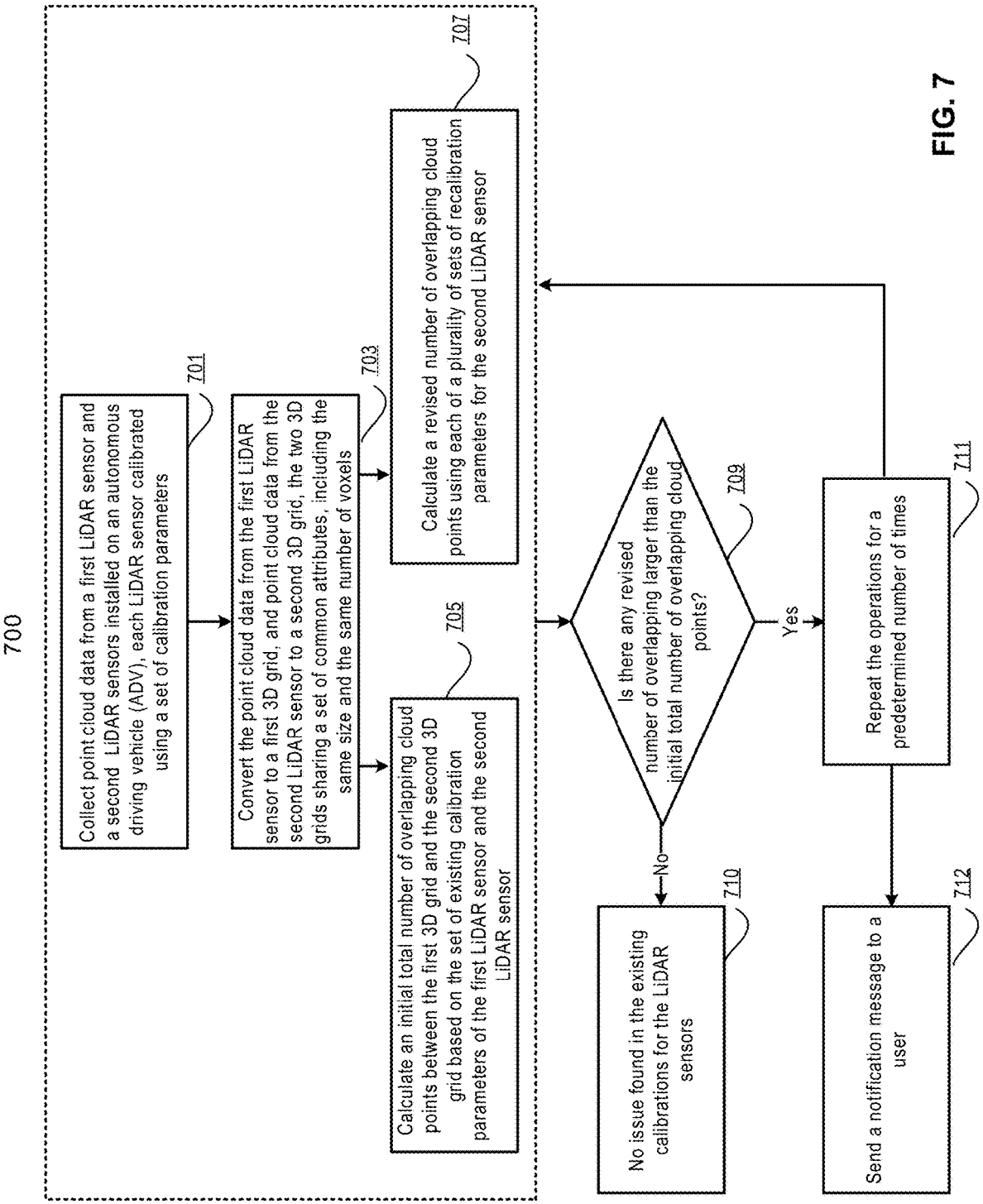
FIG. 7 illustrates a flow diagram illustrating an example of a process 600 generating a LiDAR miscalibration notification for an ADV according to one embodiment.

FIG. 7 illustrates a flow diagram illustrating an example of a process 700 generating a LiDAR miscalibration notification for an ADV according to one embodiment. Process 700 may be performed by a processing logic which may include software, hardware, or a combination thereof. For example, process 700 may be performed by the LiDAR miscalibration notification module 308 described in FIG. 3 and FIG. 4.

In operation 701, the processing logic collects point cloud data from a first LiDAR sensor and a second LiDAR sensors installed an ADV, where the LiDAR sensors have existing calibration parameters that may have been changed over time.

In operation 703, the processing logic coverts the point cloud data from the first LiDAR sensor to a first local coordinate system and place each cloud point into a first 3D grid, and coverts point cloud data from the second LiDAR sensor to a second local coordinate system, and place each cloud point into a second 3D grid. The two 3D grids have the same size and contain the same number of equal-sized voxels.

In operation 705, the processing logic calculates an initial number of overlapping cloud points between the first 3D grid and the second 3D grid based on the set of existing calibration parameters of the first LiDAR sensor and the second LiDAR sensor. When calculating the initial number of overlapping point cloud in the two 3D grids, each voxel of the first 3D grid is compared with the corresponding voxel in the second 3D grid to determine a number of overlapping cloud points in an overlapping space between the pair of voxels.

In operation 707, the processing logic calculates a revised number of overlapping cloud points using each of a plurality of sets of recalibration parameters for the second LiDAR sensor. Each set of recalibration parameters can include lever arm offsets of the second LiDAR sensor relative to an IMU mounted on the ADV, and a relative heading between the second LiDAR sensor and the IMU.

In operation 709, the processing logic compares each revised number of overlapping cloud points calculated in operation 607 with the initial number of overlapping cloud points, and determine if any revised number of overlapping cloud points is larger than the initial number of overlapping cloud points.

In operation 710, the processing determines that the calibrations of the first LiDAR sensor and the second LiDAR sensor are appropriate and no recalibration is needed when the no revised number is larger than the initial number.

In operation 711, the processing logic determines that at least one revised number of overlapping cloud points is larger than the initial number of overlapping cloud points. In such a case, a potential miscalibration is identified in the existing calibration parameters of either the first LiDAR sensor or the second LiDAR sensor, and the processing logic repeats the operations 701, 703, 705 and 707 for a number of times (e.g., 10 times), with a predetermined gap of time (e.g., one minute) following each repetition.

In operation 712, the processing logic determines that the potential miscalibration still exists during the repetitions of the operations 701, 703, 705 and 707, and can send a notification message to a user to remind the user that the first LiDAR sensor and the second LiDAR sensor need to be recalibrated.

Figure 8:
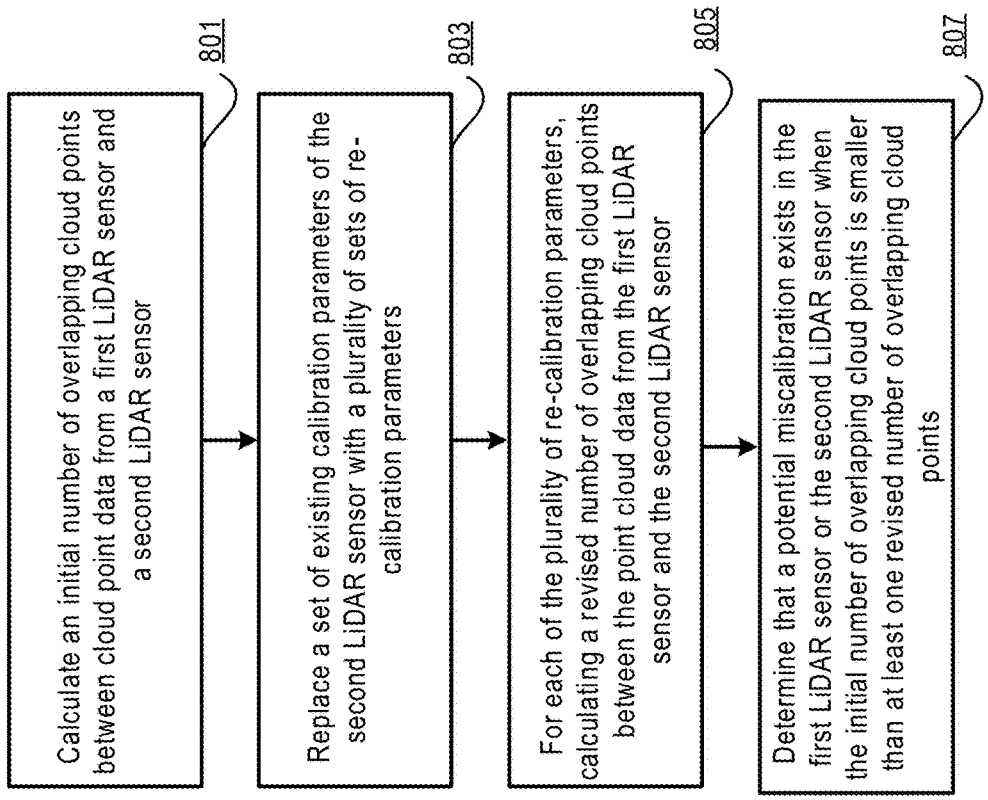
FIG. 8 illustrates an example of a process of 700 of generating a LiDAR miscalibration notification for an ADV according to one embodiment.

FIG. 8 illustrates an example of a process of 800 of generating a LiDAR miscalibration notification for an ADV according to one embodiment. Process 800 may be performed by a processing logic which may include software, hardware, or a combination thereof. For example, process 700 may be performed by the LiDAR miscalibration notification module 308 described in FIG. 3 and FIG. 4.

In operation 801, the processing logic calculates an initial number of overlapping cloud points between cloud point data from a first LiDAR sensor and a second LiDAR sensor. In operation 803, the processing logic replaces a set of existing calibration parameters of the second LiDAR sensor with a plurality of sets of recalibration parameters. In operation 805, the processing logic calculates a revised number of overlapping cloud points between the point cloud data from the first LiDAR sensor and the second LiDAR sensor for each of the plurality of recalibration parameters. In operation 807, the processing logic determines that a potential miscalibration exists in the first LiDAR sensor or the second LiDAR sensor if the initial number of overlapping cloud points is smaller than at least one revised number of overlapping cloud points.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of identifying miscalibrations in light detection and ranging (LiDAR) sensors in an autonomous driving vehicle (ADV), the method comprising the operations of:

calculating an initial number of overlapping cloud points between first point cloud data from a first LiDAR sensor and second point cloud data from a second LiDAR sensor, wherein each of the first LiDAR sensor and the second LiDAR sensor is mounted on the ADV that is in motion;

replacing a set of existing calibration parameters of the second LiDAR sensor with a plurality of sets of recalibration parameters;

for each set of the plurality of sets of recalibration parameters, calculating a revised number of overlapping cloud points between the first point cloud data from the first LiDAR sensor and the second point cloud data from the second LiDAR sensor;

comparing the initial number of overlapping cloud points with each revised number of overlapping cloud points;

identifying a potential miscalibration in at least one of the first LiDAR sensor or the second LiDAR sensor when the initial number of overlapping cloud points is smaller than at least one revised number of overlapping cloud points; and displaying a notification message on a display screen to indicate that at least one of the first LiDAR sensor or the second LiDAR sensor needs to be recalibrated.

2. The method of claim 1, wherein the identifying of the potential miscalibration further comprises:

repeating the operations for a predetermined number of times, with a predetermined interval of time after each repetition; and determining that the potential miscalibration still exists after the repeating for the predetermined number of times.

3. The method of claim 1, wherein the calculating of the initial number of overlapping cloud points and each revised number of overlapping cloud points further comprises:

converting first raw point cloud data of the first LiDAR sensor from a world coordinate system to a first local coordinate system, and placing the first raw point cloud data that has been converted to a first 3D grid in the first local coordinate system;

converting second raw point cloud data of the second LiDAR sensor from the world coordinate system to a second local coordinate system, and placing the second raw point cloud data that has been converted to a second 3D grid in the second local coordinate system;

calculating a number of overlapping cloud points in an overlapping space between each pair of corresponding voxels in the first 3D grid and the second 3D grid; and obtaining a total number of overlapping cloud points between the first 3D grid and the second 3D grid by summarizing the number of overlapping cloud points between each pair of corresponding voxels in the first 3D grid and the second 3D grid.

4. The method of claim 3, wherein the first local coordinate system uses a center of the first LiDAR sensor as an origin, and the second local coordinate system uses a center of the second LiDAR sensor as an origin.

5. The method of claim 1, wherein the set of existing calibration parameters and each set of the plurality of sets of recalibration parameters of the second LiDAR sensor include a set of lever arm offsets, and a relative heading between the second LiDAR sensor and an inertial measurement unit (IMU) installed on the ADV.

6. The method of claim 5, both the first LiDAR sensor and the second LiDAR sensor are aligned with the IMU.

7. The method of claim 1, wherein the first point cloud data from the first LiDAR sensor and the second point cloud data the second LiDAR sensor are collected from an object at a distance exceeding a predetermined threshold.

8. A non-transitory machine-readable medium having instructions stored therein for identifying miscalibrations in light detection and ranging (LiDAR) sensors in an autonomous driving vehicle (ADV), which instructions when executed by a processor of the ADV, cause the ADV to perform operations, the operations comprising:
- calculating an initial number of overlapping cloud points between first point cloud data from a first LiDAR sensor and second point cloud data from a second LiDAR sensor, wherein each of the first LiDAR sensor and the second LiDAR sensor is mounted on the ADV that is in motion;
- replacing a set of existing calibration parameters of the second LiDAR sensor with a plurality of sets of recalibration parameters;
- for each set of the plurality of sets of recalibration parameters, calculating a revised number of overlapping cloud points between the first point cloud data from the first LiDAR sensor and the second point cloud data from the second LiDAR sensor;
- comparing the initial number of overlapping cloud points with each revised number of overlapping cloud points;
- identifying that a potential miscalibration in the first LiDAR sensor or the second LiDAR sensor when the initial number of overlapping cloud points is smaller than at least one revised number of overlapping cloud points; and
- displaying a notification message on a display screen to indicate that at least one of the first LiDAR sensor or the second LiDAR sensor needs to be recalibrated.

9. The non-transitory machine-readable medium of claim 8, wherein the identifying of the potential miscalibration further comprise:
- repeating the operations for a predetermined number of times, with a predetermined interval of time after each repetition; and
- determining that the potential miscalibration still exists after the repeating for the predetermined number of times.

10. The non-transitory machine-readable medium of claim 8, wherein the calculating of the initial number of overlapping cloud points and each revised number of overlapping cloud points further comprises
- converting first raw point cloud data of the first LiDAR sensor from a world coordinate system to a first local coordinate system, and placing the first raw point cloud data that has been converted to a first 3D grid in the first local coordinate system;
- converting second raw point cloud data of the second LiDAR sensor from the world coordinate system to a second local coordinate system, and placing the second raw point cloud data that has been converted to a second 3D grid in the second local coordinate system;
- calculating a number of overlapping cloud points in an overlapping space between each pair of corresponding voxels in the first 3D grid and the second 3D grid; and
- obtaining a total number of overlapping cloud points between the first 3D grid and the second 3D grid by summarizing the number of overlapping cloud points between each pair of corresponding voxels in the first 3D grid and the second 3D grid.

11. The non-transitory machine-readable medium of claim 10, wherein the first local coordinate system uses a center of the first LiDAR sensor as an origin, and the second local coordinate system uses a center of the second LiDAR sensor as an origin.

12. The non-transitory machine-readable medium of claim 8, wherein the set of existing calibration parameters and each set of the plurality of sets of recalibration parameters of the second LiDAR sensor include a set of lever arm offsets, and a relative heading between the second LiDAR sensor and an inertial measurement unit (IMU) installed on the ADV.

13. The non-transitory machine-readable medium of claim 12, both the first LiDAR sensor and the second LiDAR sensor are aligned with the IMU.

14. The non-transitory machine-readable medium of claim 8, wherein the first point cloud data from the first LiDAR sensor and the second point cloud data from the second LiDAR sensor are collected from an object at a distance exceeding a predetermined threshold.

15. A data processing system, comprising:
- a processor; and
- a memory coupled to the processor to store instructions therein for identifying miscalibrations in light detection and ranging (LiDAR) sensors in an autonomous driving vehicle (ADV), which instructions when executed by a processor of the ADV, cause the ADV to perform operations, the operations comprising:
  - calculating an initial number of overlapping cloud points between first point cloud data from a first LiDAR sensor and second point cloud data from a second LiDAR sensor, wherein each of the first LiDAR sensor and the second LiDAR sensor is mounted on the ADV that is in motion,
  - replacing a set of existing calibration parameters of the second LiDAR sensor with a plurality of sets of recalibration parameters,
  - for each set of the plurality of sets of recalibration parameters, calculating a revised number of overlapping cloud points between the first point cloud data from the first LiDAR sensor and the second point cloud data from the second LiDAR sensor,
  - comparing the initial number of overlapping cloud points with each revised number of overlapping cloud points,
  - identifying a potential miscalibration in the first LiDAR sensor or the second LiDAR sensor when the initial number of overlapping cloud points is smaller than at least one revised number of overlapping cloud points; and
  - displaying a notification message on a display screen to indicate that at least one of the first LiDAR sensor or the second LiDAR sensor needs to be recalibrated.

16. The system of claim 15, wherein the identifying of the potential miscalibration further comprise:
- repeating the operations for a predetermined number of times, with a predetermined interval of time after each repetition; and
- determining that the potential miscalibration still exists after the repeating for the predetermined number of times.

17. The system of claim 15, wherein the calculating of the initial number of overlapping cloud points and each revised number of overlapping cloud points further comprises:
- converting first raw point cloud data of the first LiDAR sensor from a world coordinate system to a first local coordinate system, and placing the first raw point cloud data that has been converted to a first 3D grid in the first local coordinate system;

converting second raw point cloud data of the second LiDAR sensor from the world coordinate system to a second local coordinate system, and placing the second raw point cloud data that has been converted to a second 3D grid in the second local coordinate system;

calculating a number of overlapping cloud points in an overlapping space between each pair of corresponding voxels in the first 3D grid and the second 3D grid; and obtaining a total number of overlapping cloud points between the first 3D grid and the second 3D grid by summarizing the number of overlapping cloud points between each pair of corresponding voxels in the first 3D grid and the second 3D grid.

18. The system of claim 17, wherein the first local coordinate system uses a center of the first LiDAR sensor as an origin, and the second local coordinate system uses a center of the second LiDAR sensor as an origin.

19. The system of claim 15, wherein the set of existing calibration parameters and each set of the plurality of sets of recalibration parameters of the second LiDAR sensor include a set of lever arm offsets, and a relative heading between the second LiDAR sensor and an inertial measurement unit (IMU) installed on the ADV.

20. The system of claim 19, both the first LiDAR sensor and the second LiDAR sensor are aligned with the IMU.

* * * * *